July 15, 1941.  A. P. PETERS  2,249,226
WHEEL ALIGNING DEVICE
Original Filed June 10, 1939  4 Sheets-Sheet 1
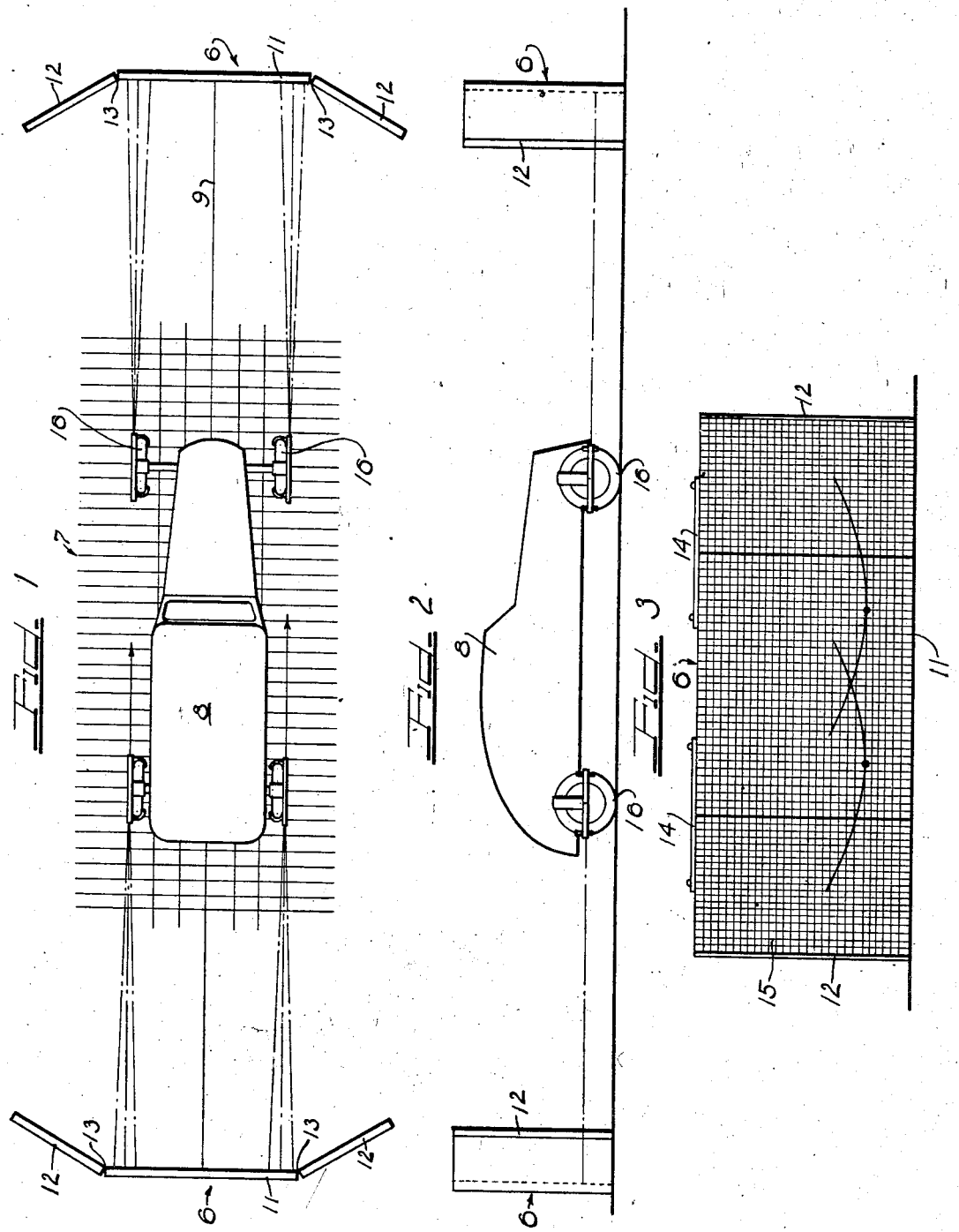

July 15, 1941.  A. P. PETERS  2,249,226
WHEEL ALIGNING DEVICE
Original Filed June 10, 1939  4 Sheets-Sheet 2
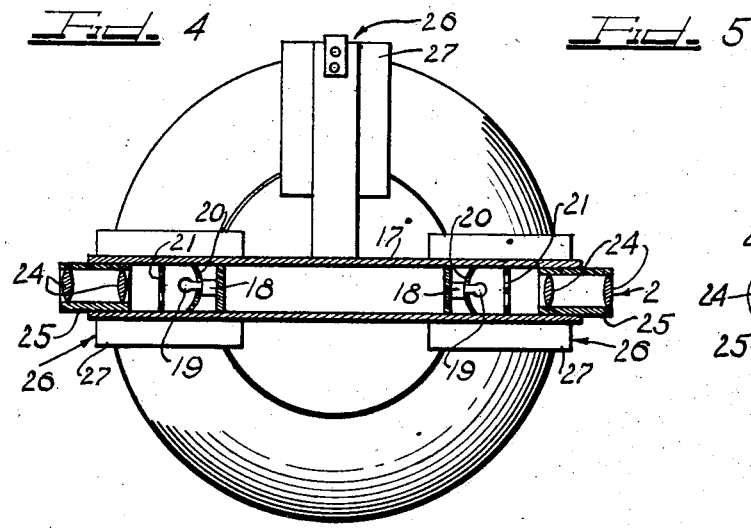
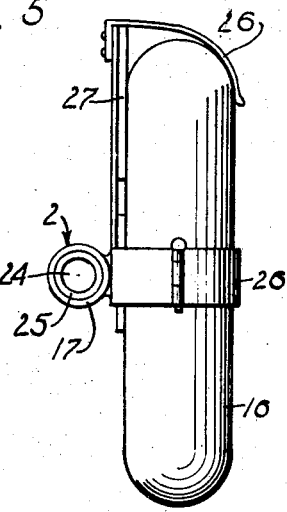
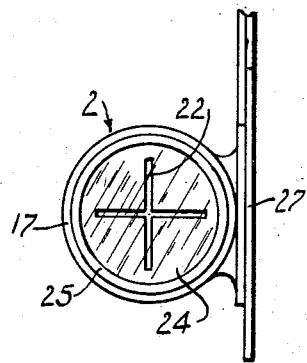
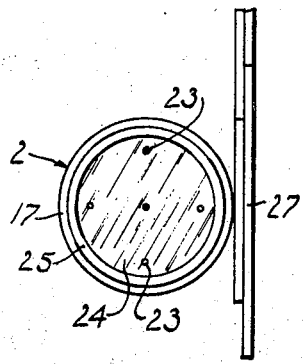
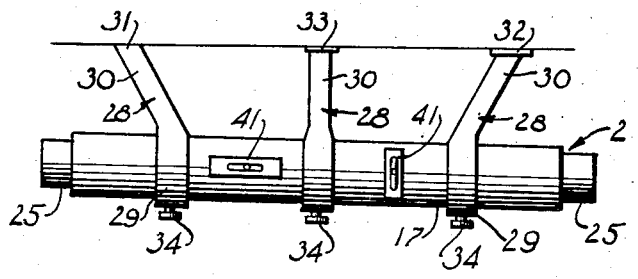
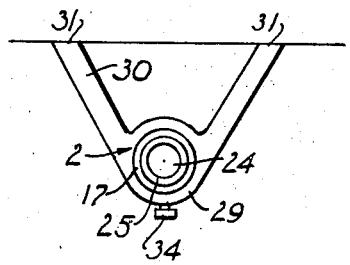
Inventor
ALBERT P. PETERS July 15, 1941.      A. P. PETERS      2,249,226
WHEEL ALIGNING DEVICE
Original Filed June 10, 1939      4 Sheets-Sheet 3
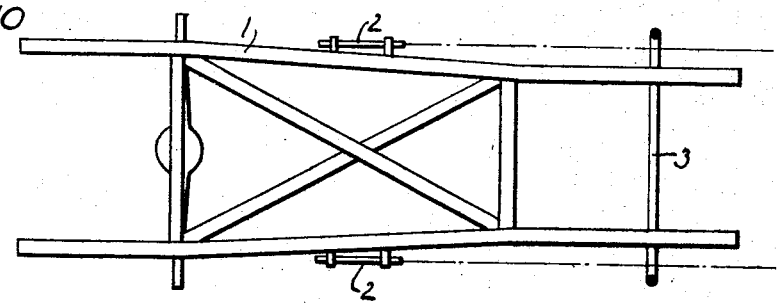
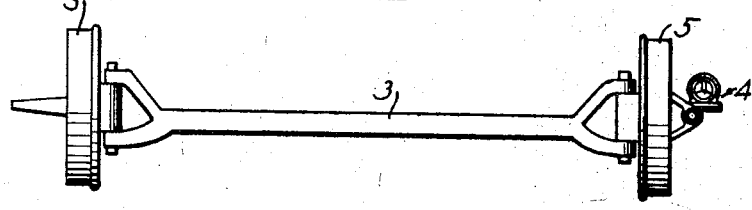
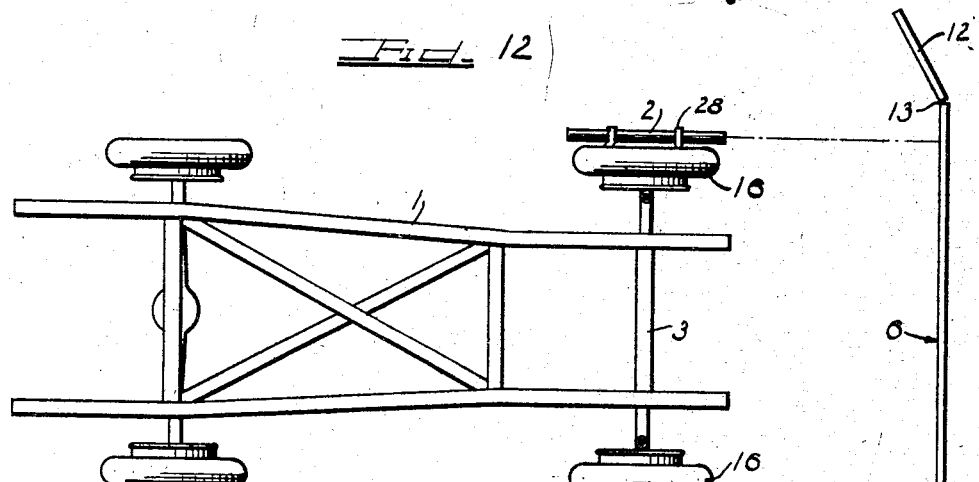
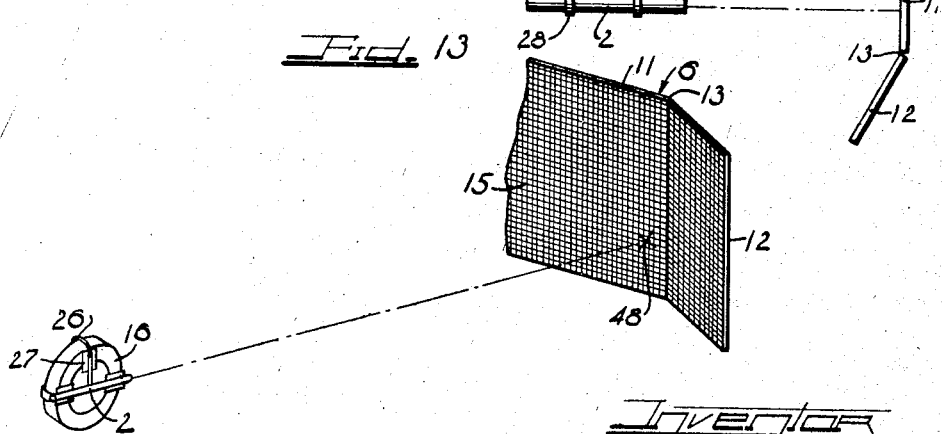
Inventor
ALBERT P. PETERS
By Charles Hill
Attys.

July 15, 1941.  A. P. PETERS  2,249,226
WHEEL ALIGNING DEVICE
Original Filed June 10, 1939  4 Sheets-Sheet 4
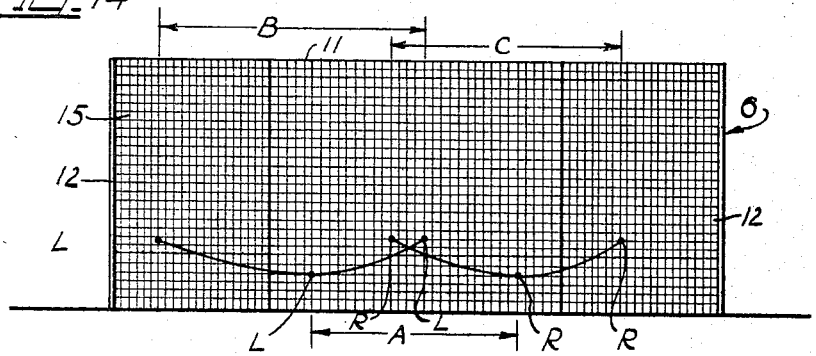
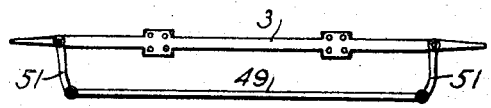
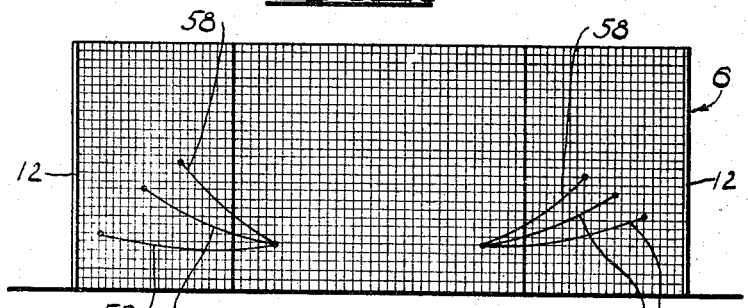
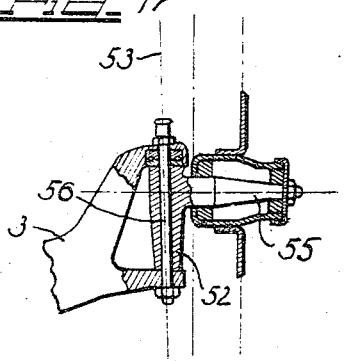
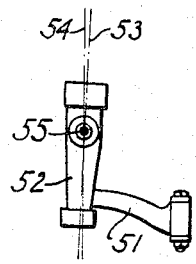
Inventor
ALBERT P PETERS
By
Attys.

Patented July 15, 1941

2,249,226

UNITED STATES PATENT OFFICE 2,249,226

WHEEL ALIGNING DEVICE

Albert P. Peters, San Francisco, Calif.

Original application June 10, 1939, Serial No. 278,507. Divided and this application May 22, 1941, Serial No. 394,583

2 Claims. (Cl. 33—46)

This invention relates to an aligning method and device. The present application is a division of my United States application Serial No. 278,507, filed June 10, 1939, and entitled "Aligning method and device."

An object of this invention is to provide an apparatus whereby the relative positions of parts of a machine or the like, or the alignment of parts of a vehicle, such as the wheels and wheel supports can be determined constantly during the assembly and adjusting operations.

Another object of this invention is to provide an apparatus for accurately indicating the positional characteristics of parts of a machine, such as the wheels or mountings of a vehicle, in such a manner as to show any misalignment and also the probable cause of any deviation from normal alignment of said parts.

Another object of this invention is to provide an aligning device which can be easily attached and detached to the parts of a machine for indicating relative alignment; particularly the device may be attached by magnetic clamps so arranged as to maintain the device in a predetermined position relatively to the parts of said machine or vehicle.

A further object of this invention is to provide a device wherein the relative alignment of parts of a machine, such as the assembly of vehicle parts, or wheel alignment and the like, is readily indicated by the relative position of light rays or beams or the like.

A further object of this invention is to provide a device wherein light rays are directed in a predetermined relative direction for indicating relative positions of machine parts, the direction being accomplished by easily detachable mountings, preferably by magnetic clamps to hold the light directing elements in selected positions.

Particularly it is an object of this invention to provide a device for the assembly of parts and mountings of a vehicle through level or relative attitude indicators magnetically held in place.

A further particular feature of this invention is to provide an apparatus wherein alignment and adjustment are accomplished by automatic constantly visible indication of relative attitude of the respective parts without requiring dismantling, repeated manual tests, and measurements of the relative position of parts; the indication being accomplished by the reflection of light rays onto a tabulated surface from a definite position of the parts to be tested relatively to said surface so that an enlarged and sometimes exaggerated indication of the relative attitude of said parts can be observed on the surface at all times while the work of assembly or aligning is continued uninterrupted; the surface being so graduated and arranged as to coact with the projected light rays to indicate by the nature of the path described by the light rays or light beams the characteristics of alignment that may influence a given attitude of the relative parts.

Another object of this invention is to provide an aligning device whereby the degree and cause of misalignment of the wheels of a vehicle can be determined speedily by the behavior of a light ray or light beams relatively to a graduated surface.

Other objects of this invention are to provide an aligning device that will be superior in point of simplicity, inexpensiveness of construction, positiveness of operation, facility and convenience in use and general efficiency.

Other objects of the invention together with the foregoing will be set forth in the following description of the embodiment of means according to this invention, which are illustrated in the drawings accompanying and forming part of the specification. It is to be understood that I do not limit myself to the embodiment disclosed in said description and the drawings as I may adopt variations of my preferred forms within the scope of my invention.

With the foregoing and other objects in view, which will be made manifest in the following description, reference is had to the accompanying drawings for the illustrative embodiment of the invention, wherein:

Figure 1 is a plan view of the arrangement of the co-acting surfaces and devices with respect to an automobile for performing my aligning method.

Figure 2 is a side view of the boards or surfaces with the automobile in place therebetween.

Figure 3 is a front view of a graduated surface showing the path of the light ray travel thereon when the wheels are turned in opposite directions.

Figure 4 is a side view of a wheel with my light direction device shown in section thereon.

Figure 5 is an end view of the wheel with the light direction aligner device thereon.

Figure 6 is an end view of a modified form of the device.

Figure 7 is an end view of another form of my device.

Figure 8 is a side view of a magnetically clamped aligning device.

Figure 9 is an end view of the magnetically clamped aligning device.

Figure 10 is a diagrammatic view of the step wherein the light beams are used in assembly for aligning the frame or chassis and position of wheel mounting.

Figure 11 is a diagrammatic view showing the use of a level instrument for aligning the wheel and axis assembly.

Figure 12 is a top plan view of the wheel alignment relatively to a graduated surface outside of the vehicle.

Figure 13 is a perspective diagrammatic view of the device on a wheel in relative position to the graduated surface so as to indicate thereon "camber."

Figure 14 is a front view of the graduated surface showing the indications for the "toe-out" and turning radius.

Figure 15 is a plan view of the steering rod assembly the adjustment or bending of which influence the "toe-in," "toe-out" and turning radius.

Figure 16 is a front view of the graduated surface showing the lines of travel of the light beam on the surface at various alignments of the compound adjustment for caster and king pin inclination.

Figure 17 is a sectional view showing the king pin inclination indicated on the diagram in Figure 15.

Figure 18 is a side view of the steering knuckle showing the axis position causing the caster indicated on the diagram in Figure 15.

My method in general includes the steps of assembling the parts of a machine by the use of a leveling indicator held magnetically on a desired part. At a certain stage of the assembling operation the aligning adjustments are made by means of a ray or beam of light projected upon a graduated screen from a predetermined position relatively to the screen. The relative attitude of said parts can be ascertained by observation from a distance and the parts can be adjusted until the indication on the graduated screen corresponds to a desired alignment.

In detail my method includes the steps of preferably magnetically attaching a light projecting element to a part of a machine, for instance to the chassis of a vehicle or automobile, so as to point or project the light beam to another part of the chassis where another part, such as the axle must be assembled in direct line with said light beam. The assembly can be accurately performed at the point constantly located by the fixed beam of light. Then for relative alignment of parts of such assembly calibrated levels are magnetically located and held on the brake drum. By the use of such calibrated levels the steering gear is adjusted and the various adjustments such as the camber, caster, king pin slant and the like are roughly set. Then final adjustments are checked and achieved accurately by the projection of light beams from said parts onto a graduated screen outside of the vehicle in such a manner that any misalignment is exaggerated for ready observation.

The first step is illustrated on Figure 10, wherein the chassis 1 of the automobile has on each side thereof supported a light projector 2 directed forwardly to the desired location of the ends of the front axle 3. This step may be also used for straightening the frame of the vehicle by detecting the distortions of parts of the frame from straight aligned positions as indicated by the light beams.

The second step is illustrated on Figure 11, wherein the levels 4 are magnetically attached to a brake drum 5 so as to allow rough setting of the wheel and steering gear mounting during assembly.

The third step is illustrated on Figure 12, where, after the assembly and rough setting of the wheels, the light projectors magnetically held on the wheels project beams of light, preferably in the form of fine point or hairline shape light rays into a spaced screen 6 and final adjustments of the wheel and its mounting are made to correct errors or misalignments indicated by the position or path of the light beams on the graduated screen.

In the event of testing or aligning wheels the same can be accomplished without dismantling or measurements on the floor. The automobile is located on a graduated base or floor chart 7 so that its wheels are at a definite distance from the screens 6, then a light beam is projected from the rear wheels to the front axle or wheels to check the alignment with the front wheels. Then the light beams are projected from each of the front wheels onto the screen 6 so that the paths of the light beams at a complete turn of the wheels in either direction relatively to said graduated base 7 are projected on the graduations of the screen indicating the relative attitude of the wheels.

It is part of my method to so project the light rays or beams from the front wheels that the camber of the wheel is truly shown relatively to vertical and horizontal markings, and so that the caster misalignment is evidenced by distortion horizontally and king pin misalignment by distortion vertically with relation to corresponding horizontal and vertical coordinates of the graduations on the chart or screen 6. The "toe-in," "toe-out" and turning radius, are indicated by the balance of the increase of distance at turns to both directions between the light beams projected from front wheels. By first charting the path of projected light beams on a screen 6 corresponding to normal alignments, deviations from that charted path indicate misalignment, and according to the direction and angle of deviation the cause of misalignment can be determined with certainty without dismounting the wheels or measuring the wheel positions, wheel mountings or steering gear assembly. It is preferable that the light beams be projected from magnetically held source easily and accurately maintained in position on the part to be tested.

The apparatus for carrying out my method includes the graduated base or floor chart 7 on which the automobile 8 is located on a predetermined graduation line corresponding to a given type of vehicle. Aligned with the center line 9 of the graduations of the base 7 is the screen 6 which has a central panel 11 and sides or wings 12 preferably hinged at 13 so as to be adjustable to desired angles. Fastening strips 14, or other suitable latches, hold the wings 12 in their adjusted angular positions relatively to the central panel 11. The panel 11 and the wings 12 are provided with vertical and horizontal graduations 15 spaced at a given spacing to permit readings corresponding to actual relative attitude of the wheels 16 of the automobile 8 located at a predetermined distance from the screen 6. There may be charts provided on the screen 6 indicating the normal location or path of light projection for a given type or model of vehicle with which the behavior of the corresponding type or model of vehicle under test can be compared. Markings for normal points relative to which adjustments may be made can be also pinned, or hanged on suitable hooks or the like on the charts or screens 6.

The projector 2, in the illustrative form herein described, includes a tube 17 in one or both ends of which is an electric light socket 18 suitably connected to a source of electricity. A suitable light globe 19 is in the socket 18. Around the light globe 19 is a reflector 20. In front of the light globe 19 is a shade 21 which has an opening for the transmission of light rays in a selected shape of beam or beams. For instance, the shade in the form shown in Figure 6 has so-called "cross hair" slots 22, and the shade shown in Figure 7 has spaced point apertures 23 to transmit light rays reflecting dots on the screen 6. In the extreme end of the tube 17 are lenses 24 in a suitable casing 25 so as to be adjustable for proper focusing of the projected light beams. Similar projection units are provided in both ends of the tube 17 as shown in Figure 4, projecting light beams in opposite directions.

The projector 2 is mounted on a bracket which has three clamps 26 adapted to clamp over the tire of the wheel 16 at two horizontally opposite points and at a point at the top at right angles to the horizontal clamps. Aligning plates 27 hold the bracket in a plane substantially parallel with the plane of the wheel 16.

For quick and accurate adjustment it is preferable that the projector 2 be magnetically clamped and held in place as shown in Figures 8 and 9. In the illustrative embodiment of magnetic clamping of the projector 2 are shown three permanent magnets 28, each of which has a tubular hub 29, fitting over the tube 17, and legs 30 spread at an angle but having ends 31 leveled substantially parallel with the axis of the tube 17. In this manner when the magnetic clamps are engaged with a surface of the part to be tested the projector 2 is automatically aligned with the surface so engaged. Inasmuch as the legs 30 are of such length that all the ends 31 thereof are aligned with each other the projector is held parallel with the surface engaged by its magnetic clamps. In some instances, such as for certain indications of so called "toe-in" adjustment, magnetic spacer washers 32, as shown in Figure 8 may be interposed between the ends 31 of the legs 30 near one end of the projector 2, and correspondingly narrower washers 33 placed below the ends 31 of the legs 30 of the middle clamp 28 so as to hold the projector 2 at a predetermined outwardly diverging angle relatively to the surface of the wheel 16 so that as the beams of light projected from the projectors 2 on the front wheels 16 of the vehicle are parallel then the wheels 16 are actually adjusted to a degree of "toe-in" determined by the thickness of said spacer washers 32 and 33. The magnetic clamps 28 are held in adjusted position on the tube 17 by means of suitable setscrews 34 so that all the magnets 28 point with their legs 30 toward the surface to be tested. The direction of the legs 30 may be reversed by placing the end magnets 28 on the tube 17 so that the legs 30 converge toward the middle of the projector 2. Thus the same clamps 28 may be used to clamp on larger or smaller surfaces.

While the magnetic clamping and adjusting of the projector 2 is always preferable, yet in some instances the existing bolts or bolt holes may be utilized for fastening the projector 2 in place. For instance, the projector tube may be supported on brackets the ends of which are held by the usual bolts in the usual bolt holes of the brake drum.

It is to be noted that the tube 17 of the projector 2 has a pair of bubble levels 41 located at right angles to each other whereby the use of levels in adjusting is combined with the light beam indications for accuracy. This also facilitates the accurate location of the projector 2 at a desired angle.

In operation, for instance in connection with vehicle wheels, the axles, knee action units, or independent wheel suspensions are to be first bolted or attached to the frame. In order to insure a degree of accuracy of their alignment the beam of light is preferably magnetically held on each side of the frame 1. The opposite light beams are placed some distance back of the location of the wheel assembly and are equally aligned on each side of the frame 1. The beam of light is thus fixed in this illustration by the symmetrical mounting of the projectors 2 on the opposite sides of the frame 1 as shown in Figure 10 so that the light beams point to the desired location of the units to be mounted at the front end of the frame. The axles, knee action units, or independent wheel suspension are in properly aligned position relatively to the frame 1 when the light beams projected from the projectors 2 point directly upon said mounted units.

On the usual front wheel 16 of the automobile 8 the wheel spindles, hubs and brake drums are then attached. In the adjusting of these parts to a proper caster, camber and king pin slant the levels are used on suitable platforms or brackets attached to the parts worked on preferably by magnetic clamps. Thus these approximate adjustments are achieved before the wheel is attached in place.

After the wheel 16 is assembled the final alignment is accomplished by setting the wheels 16 at a predetermined distance from the graduated screen or chart 6, and attaching to the wheels 16 the projectors 2 so that a light beam is projected from each wheel 16 upon the screen or chart 6. By manipulating the wheels 16 in the manner of their actual operation the location and path of the light beams on the graduated chart 6 gives accurate indication and reading of the camber, toe-in, caster, the rise and fall of the wheels, the steering angle, the king pin slant, the included angle, turning radius or other behavior of the wheels 16 when they are turned in either direction. This is accomplished by the setting of the wheels on a predetermined line on the base or floor chart 7, which renders the readings on the wall chart or screen 6 accurate. The mechanic does not need to check instruments or remeasure the various units worked on. The beam of light on the screen or chart 6 changes location as the mechanic is making the adjustments and indicates the setting.

An example of necessary adjustment is the camber of the wheels. The front wheels of a vehicle are closer together at the bottom or ground than they are at the highest points directly above. The idea of cambering is to make the center line of the usual spindle bolt or its equivalent, coincide, as near as practical, with the center of contact of the tire with the ground. In other words, the purpose of the camber is to bring the point of contact of the tires with the road more nearly under the spindle pins, or king bolts, thus permitting the car to steer more easily. This camber is usually given to the steering knuckles and spindle by tilting the steering knuckle so that the steering knuckle is at outwardly and upwardly spread angle instead of being perfectly vertical. In Figure 13 the vertical line of the cross-hair line is parallel with the wheel 16. The cross like beam 48 appears at an angle to the vertical graduations on the screen 6. If the camber is lost or is not of proper angle, then the mechanic can adjust the axle, or the knee action support, or the like mounting, until the vertical line of the cross beam on the screen 6 is at a desired angle or camber.

Another example of adjustment of the front wheels is the so-called toe-in which is an adjustment to offset the wearing action on the tires by the camber, and to produce more even wear on them. This refers to the converging of the front wheels toward each other at the front. An additional reason for this adjustment is that when the vehicle is running at high speeds, the wheels have a tendency to "toe-in." If toed-in too much, or not enough, the treads of the tires will grind. The toe-in is checked in my method and device for attaching to the front wheels 16 the projectors 2 so as to reflect a light beam onto the screen or chart 15. Then the spacers 32 and 33 are placed under the legs 30 of the magnets 28 as heretofore described so as to diverge the light beams relatively to the plan of the wheels 16 to the desired angle of toe-in. By adjusting the wheels until the light beams are parallel the desired toe-in is set.

The so-called toe-out and the turning radius of the front wheels 16 are closely related to the toe-in adjustment of the wheels. As shown in Figure 14, these adjustments can be easily checked by the varying distance between the reflections of the light beams on the chart or screen 6 as the wheels are turned in opposite directions. These distances in opposite directions should balance for equal toe-outs and turning radii. The initial points where the light beams appear on the chart or screen 6 are denoted herein by the letters R and L indicating respectively the reflections of the light beams projected from the right and left wheels of the vehicle. The distance on the chart between the projected beams is denoted on Figure 14 by the letter A. Then the wheels 16 are turned fully in one direction, for instance, toward L in Figure 14. At the extreme turn the distance between R and L is as denoted by the letter B which by reason of the compensating turning radius is larger than the distance A. Then the wheels are turned in the other direction and at the end of the full turn the distance between the points L and R is as denoted by the letter C which is also usually larger than the initial distance A.

Any difference between the distance B and C at the respective extreme turns of the wheels 16 indicates an unbalanced condition. The mechanic can make the adjustments until the respective extreme distances are balanced by observing the reflections on the screen 6, without the need for repeated measurements.

The toe-in adjustment is usually dependent on the cross steering rod 49, and the toe-out and turning radius adjustments are usually dependent on the steering arms 51, a diagrammatic assembly of which is shown in Figure 15. The toe-in is usually adjusted by adjusting the length of the cross steering rod or tie rod 49 from one steering knuckle to the other. If this does not correct the adjustment then it may be necessary to straighten a bending of the axle 3 or of the spindles. The most common cause of discrepancy in the adjustment of the toe-out or turning radius is that one of the steering arms 51 is bent. Therefore this discrepancy can be corrected by straightening the steering arm 51 until the relative distance between the light beam points R and L is of the desired balanced length.

Another common and important adjustment is the adjustment of the caster of the front wheels. This adjustment is an upward and rearward incline of the steering knuckle 52, as shown in Figure 18, so that the steering axis 53 therethrough meets the ground in advance of the point of contact of the wheel. The vertical axis 54 in Figure 18 points substantially toward the point of contact of the wheel at the bottom. Thus the front wheels 16 are purposely placed out of perpendicular, or castered, in order to bring the point of contact between the tire and road more directly under the steering spindle 55. Due to this offset from the perpendicular the wheels 16 rise and fall as they are turned in the respective directions. Another adjustment which manifests itself in the rise and fall of the wheels while being turned is the inclination of the king pin 56 as shown in Figure 17. This so-called king pin slant is sidewise and inward of the vehicle at the top of the king pin 56, to facilitate steering. The rise and fall of the wheels 16 is therefore the result of a compound action or adjustment of the caster of the steering knuckle and of the inclination or slant of the king pin 56. The wheels in this respect must be balanced.

The path of the light beam reflection on the screen 6 indicates any irregularity of the rise and fall of the wheels 16 during a turn and the path responds differently to irregularities caused by one or another of the component causes of said rise and fall. For instance, viewing Figure 16, the middle path 57 is the normal path when the caster and the king pin slant both are normal. This path 57 may be indicated on the chart in any suitable manner such as by pinning or hanging or drawing on the chart the normal light beam path 57 for a certain type of vehicle front wheels. The offset of the king pin manifests itself in variation of the path of light along the vertical coordinates of the chart. The horizontal components of the paths of light indicate the relative caster alignment. When the king pin inclination is increased above the normal angle of inclination then the path is distorted upwardly from the normal as shown by the paths 58 on Figure 16. A straightening of the king pin position relatively to the vertical and outwardly causes a distortion of the light beam paths downwardly as shown on the paths 59 below the normal paths 57. On the other hand, it was found that the horizontal distortion of said paths 58 and 59 corresponds to a misalignment of the angle of caster. It is important that the caster and king pin inclination of the front wheels be equalized, and this characteristic is quickly ascertained and corrected by observing the relative paths of the light beams projected onto the screen. The mechanic can change the adjustments, or tilt the axle, or bend the knuckle, while observing the light beam on the chart until the light beams indicate equalization and correction of the adjustments on both front wheels 16.

It is to be noted that there is a certain amount of travel of the wheels 16 during turning even when the vehicle is otherwise stationary and this travel would cause further distortion of the path which might be misleading in some instances. It is therefore desirable that during the checking of any adjustments that require turning of the wheels, the front wheels be either off the ground or be supported on suitable swivel plates, so that only the true rise and fall caused by the wheel mountings is indicated on the screen or chart.

The alignment of the rear wheels with the front wheels is also readily ascertained by projecting light beams from the rear wheels to the front wheels in alignment with the projectors 2 on the front wheels. When the light beams coincide then the rear wheels are properly aligned with the front wheels. The mechanic can make his adjustments in case of misalignment until the light beams from the rear wheels are brought into directional coincidence with the light beams from the front wheels.

The wings 12 of the screen 6 are preferably always set so that they are substantially at right angles to the beams of light when the wheels are in extremely turned positions. The charts 15 on the screens 6 are graduated and marked to indicate the true distance of distortion relatively to a set point or line on the floor chart 7. If so desired, the rear wheels may be checked by rearward projection of light beams on a rear screen 6 as shown in Figure 1. Screens or charts may be employed in other relative positions, such as at one side or both sides of the vehicles. In such arrangements the graduations must be tabulated to allow for lateral reading of variation of light paths corresponding to certain adjustments.

The characteristics of wheel location and movements responsive to certain adjustments are thus reproduced on an enlarged scale in readily observable position. The instruments are quickly and easily attachable to the parts to be checked. The magnetic clamps fasten securely and accurately.

It was found that each adjustment or irregularity of the wheel mounting causes a characteristic distortion of the position and path of the light beams projected from the wheels. These characteristic variations can be charted for various types of vehicles and the vehicles can be quickly tested relatively to such chart. The characteristic deviations from such normal chart definitely determine and indicate the cause of the misalignment without necessitating complicated measurements and without dismantling the wheels, the steering gear, or mountings. By coaction with the floor chart 7 each type of vehicle can be accurately lined up at a predetermined distance from the wall chart or vertical screen 6. The indication by the light beams remains constantly observable while the mechanic makes the adjustments obviating the need for repeated stopping of the work for measurements and checks. The diagnosis and adjustments of the parts and wheels are thus obtained with accuracy and ease, and with immediate indication and correction of the cause of any misalignment.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. An apparatus for depicting the deviation from predetermined standard turning characteristics of the turning characteristics of the front wheel of a vehicle including means for projecting a beam of light from said wheel in fixed relation to the plane thereof and a screen having indicia thereon which coincide with the pattern formed on said screen when and only when said screen intercepts said beam of light at a predetermined distance from said wheel and said wheel has said predetermined standard turning characteristics.

2. An apparatus for depicting the deviation from a predetermined standard angular inclination of the front wheel of a vehicle as mounted on a king pin, said apparatus comprising means for projecting a beam of light, means for attaching said projecting means to said wheel in fixed relation to the plane thereof, and a screen having indicia thereon which will coincide with the pattern formed on said screen by said beam when, and only when, said screen intercepts said beam at a predetermined distance from said wheel and said wheel has said predetermined standard inclination.

ALBERT P. PETERS.